United States Patent Office.

GEORGE B. BRAYTON, OF BOSTON, MASSACHUSETTS, ASSIGNOR TO "THE NOVELTY EYELET COMPANY," OF SAME PLACE.

Letters Patent No. 89,847, dated May 11, 1869.

IMPROVED COMPOSITION-METAL FOR EYELETS.

The Schedule referred to in these Letters Patent and making part of the same.

*To all whom it may concern:*

Be it known that I, GEORGE B. BRAYTON, of the city of Boston, in the county of Suffolk, in the State of Massachusetts, have invented a new and useful Improvement in Composition-Metal for Eyelets; and I do hereby declare that the following specification is a full, clear, and exact description thereof.

Letters Patent of the United States were granted to me, dated August 6, 1867, for the improvement in the manufacture of eyelets, which consists in the employment of a metal composed of tin and zinc, in combination, and possessing peculiar fitness for such manufacture.

The present invention appertains to the same subject, and consists of the same elements, with the addition of a certain proportion of lead.

The object of the addition of this third element is to increase the mass, by the introduction of a comparatively cheap metal, possessing qualities which enable it to combine with the other metals employed, whereby a less costly composition-metal is obtained, not essentially different in appearance, or inferior in utility, for the purpose designed, than that which is described in the patent before referred to.

The proportions of the several metals named, which I have found the best for use, are twenty-three pounds of zinc and eighteen pounds of lead to each two hundred pounds of tin.

They should be melted together, and agitated by stirring, to secure a thorough intermixing of the particles.

The composition can then be cast into ingots, or into the form of small cylindrical masses around mandrels, to be subsequently rolled, in the one case, into sheets, or, in the other case, to be drawn out into tubing, according to the process which is to be employed to manufacture it into eyelets.

The precise proportions given need not be strictly adhered to, as a successful result does not depend upon a nice observance of the formula for the composition, but care should be taken not to have the proportions of lead and zinc much in excess of the quantities given, as otherwise the composition will be rendered deficient in ductility, as well as inferior in color.

What I claim as my invention, and desire to secure by Letters Patent, is—

The use of a metal for eyelets, composed of the elements, and of the character substantially as described.

GEO. B. BRAYTON.

Witnesses:
DANIEL SHARP,
C. H. DEWING.